United States Patent [19]

Umemoto

[11] Patent Number: 4,920,557
[45] Date of Patent: Apr. 24, 1990

[54] RADIO COMMUNICATION APPARATUS

[75] Inventor: Yuji Umemoto, Hino, Japan

[73] Assignee: Kabushiki Kaisha Toshiba, Kawasaki, Japan

[21] Appl. No.: 243,751

[22] Filed: Sep. 13, 1988

[30] Foreign Application Priority Data

Sep. 14, 1987 [JP] Japan .............................. 62-230232

[51] Int. Cl.5 .............................................. H04Q 7/04
[52] U.S. Cl. ..................................... 379/61; 455/127; 379/58
[58] Field of Search ..................... 379/58–63, 379/375; 455/127, 343

[56] References Cited

U.S. PATENT DOCUMENTS

| | | | |
|---|---|---|---|
| 4,450,319 | 5/1984 | Lucey | 379/61 |
| 4,523,058 | 6/1985 | Stevens et al. | 379/375 |
| 4,574,164 | 3/1986 | Orikasa | 379/63 |
| 4,639,550 | 1/1987 | Yamagawa et al. | 379/62 |
| 4,640,987 | 2/1987 | Tsukada et al. | 379/62 |
| 4,736,404 | 4/1988 | Anglikowski et al. | 379/62 |

FOREIGN PATENT DOCUMENTS

| | | | |
|---|---|---|---|
| 0070833 | 4/1985 | Japan | 379/58 |
| 0024335 | 2/1986 | Japan | 379/63 |
| 0186032 | 8/1986 | Japan | 379/63 |
| 0222327 | 10/1986 | Japan | 379/58 |

Primary Examiner—Robert Lev
Attorney, Agent, or Firm—Finnegan, Henderson, Farabow, Garrett and Dunner

[57] ABSTRACT

A radio communication apparatus comprising a base unit connected to a communication line and a radio terminal unit connected to the base unit via radio circuit. When there is an incoming signal from the communication line in a state in which the radio terminal unit is connected to the base unit, a speaker of the base unit is caused to generate a ring tone. When there is an incoming signal from the communication line in a state in which the radio terminal unit is not connected to the base unit, a speaker of the radio terminal unit is caused to generate a ring tone for only a predetermined time.

9 Claims, 8 Drawing Sheets

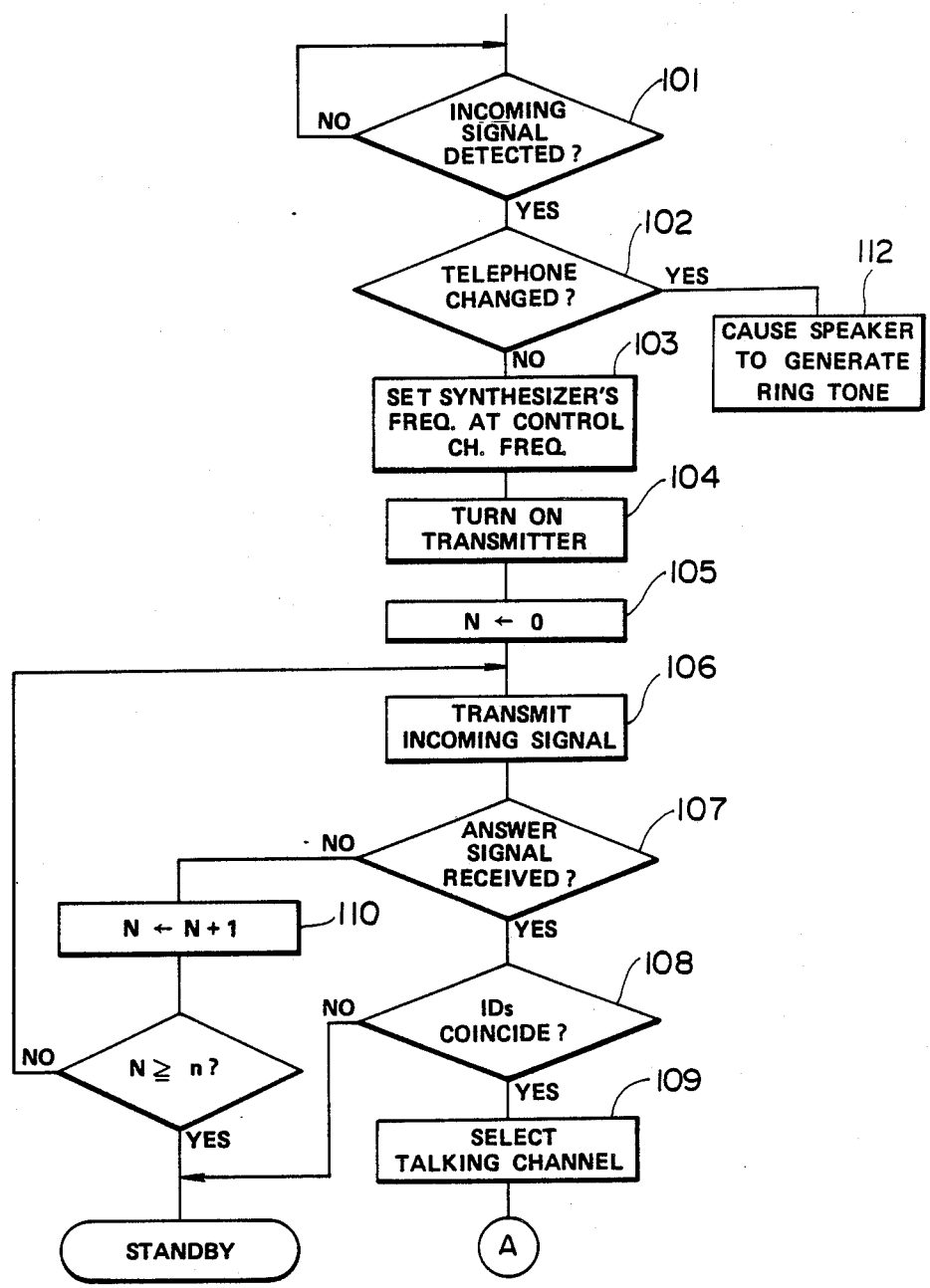
FIG. 2 PART I

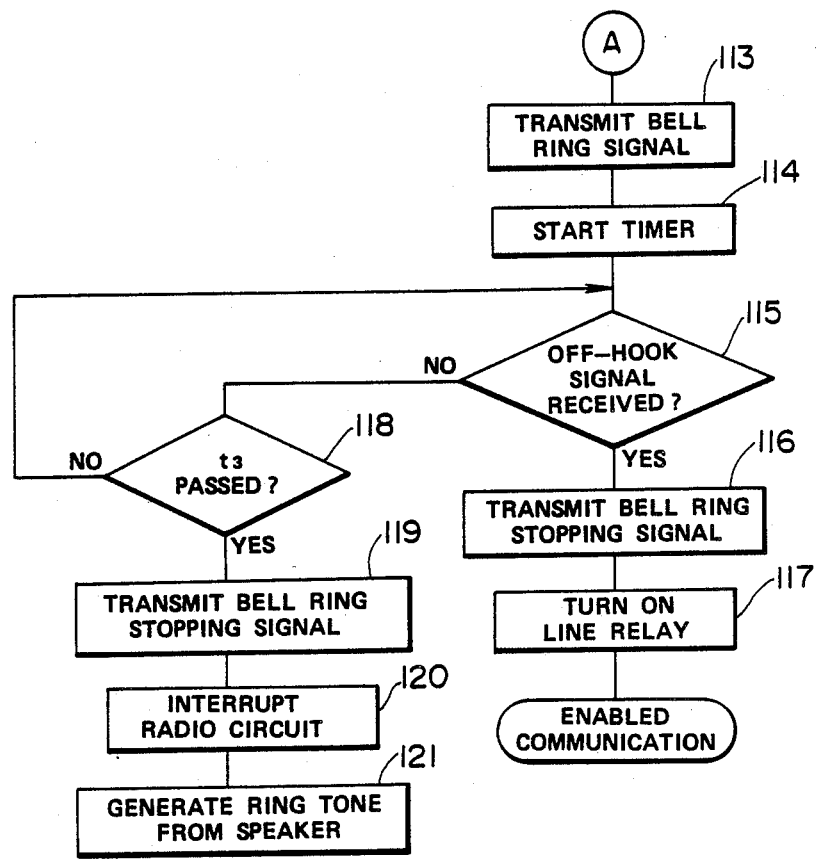
FIG.2 PART II

RADIO COMMUNICATION APPARATUS

BACKGROUND OF THE INVENTION

1. Field of the Invention

The present invention relates to radio communication apparatus which include a base unit connected to a communication line and radio terminals connected through a radio circuit and, more particularly, to apparatus which limit the duration of a ring tone generated by a radio terminal to thereby reduce the consumption of a battery of the radio terminal and to greatly prolong the time in which the radio terminal is used in a non-charged state.

2. Description of the Related Art

FIG. 7 is a block diagram of a radio communication apparatus of this type in which a base unit 1 is connected via a radio circuit to a radio telephone set 2 and also to a telephone line 3.

The signal delivered via the telephone line 3 is supplied as a modulation input to a transmitter 5 via a hybrid circuit 4. The signal modulated by and output from the transmitter 5 is transmitted as waves to the radio telephone set 2 via a transmitting antenna 6.

The waves transmitted by the radio telephone set 2 are received by a receiving antenna 7 and demodulated by a receiver 8 of the base unit. The demodulated signal is delivered by the hybrid circuit 4 to the telephone line 3.

A synthesizer 9 delivers to the transmitter 5 and receiver 8 a signal having a frequency corresponding to a radio channel.

One of the outputs from the receiver 8 is input to a received-field intensity detector 10 in order to determine the field intensity. The circuit 10 is generally called a carrier squelch circuit or a noise squelch circuit. Another output from the receiver 8 is delivered as a data signal contained in the demodulated received signal to an identification signal detector 11 which checks an identification signal determined by the combination of the base unit 1 and radio telephone set 2. The identification signal is generally called an ID code signal.

The output from the detector 11 and the modulated data signal are input to a control circuit 12 for use in the connection control. The control circuit 12 controls the synthesizer 9 to provide switching control between radio channels or to cause a transmission data signal to be input as a modulation input to the transmitter 5.

The radio telephone set 2 also includes a receiving antenna 13, a receiver 14 and a transmitting antenna 18. The demodulated output from the receiver 14 is delivered to a telephone receiver 15. The voice input to a telephone transmitter 16 becomes a modulation input to the transmitter 17 and the resulting modulated signal is transmitted via the transmitting antenna 18.

A synthesizer 19, a received-field intensity detector 20, and an identification signal detector 21 are similar to the corresponding ones of the base unit 1. A control circuit 22 provides the entire control of the radio telephone set 2. A speaker 23 is a sounder which generates a ring tone when there is an incoming call. A power source for these elements in the base unit includes an AC plug 24 connected to an AC 100 V source and a rectification stabilizing circuit 25, the outputs of which are provided to the respective required elements. The output from the stabilizing circuit 25 is supplied to a chargeable battery 29 for the radio telephone set 2 via a current restricting resistor 26 via a pair of charging terminals 27 and 28. The output from the battery 29 is used as a power source for the radio telephone set 2. Reference numeral 31 denotes a power source switch for the telephone set 2; 32, a dial key unit used for transmitting a call; and 33, a line relay forming a direct current loop.

The control of this conventional apparatus when there is an incoming call is outlined as follows. When an incoming signal detector 30 of the base unit 1 detects an incoming signal from the telephone line 3 when the base unit is in a standby state, it sets the oscillating frequency of the synthesizer 9 to a control channel frequency, and turns on the transmitter 5 to cause same to transmit the incoming signal which contains a signal designating a talking channel S-CH.

The radio telephone set 2 turns on the synthesizer 19 for a predetermined interval of time t1 in its standby state, sets the oscillating frequency of the synthesizer at the control channel frequency and turns on the receiver 14. When the incoming signal is received, the telephone set 2 turns on the transmitter 17 to cause same to deliver an answer signal and selects the designated talking channel S-CH. Unless an incoming signal is received, the synthesizer 19 and receiver 14 are turned off for a predetermined interval of time t2.

When the base unit 1 detects the waves from the radio telephone set 2 using the received-field intensity detector 10, it stops transmission of the incoming signal. Unless waves from the radio telephone set 2 are detected, the base unit continues to transmit the incoming signal up to a predetermined number of times n. The transmission continues because the radio telephone set 2 is in an intermittent reception state in which the telephone set cannot receive signals for the interval of time t2. The reason why the transmission is stopped after it is performed up to n times is to avoid useless occupation of the control channel when the power source for the telephone set 2 is off or the telephone set 2 is at a great distance from the base unit.

If the ID code signal contained in the answer signal from the telephone set 2 coincides with a preset code, the base unit 1 selects the talking channel S-CH designated by the incoming signal. If not, the base unit 1 waits for the disappearance of the call from the telephone line 3 and then returns to the standby state thereof because there may be a response from a radio telephone set on another set.

After the base unit 1 selects the channel S-CH, it delivers a bell ring signal. When the telephone set 2 receives this signal, it generates a ring tone from a speaker 23. If the telephone set 2 responds to the ring tone by going off-hook, it sends an off-hook signal to the base unit to thereby enable communication.

When the base unit 1 receives the off-hook signal, it stops transmission of the bell ring signal and closes the line relay 33 to establish a talking loop via the telephone line 3 to thereby enable telephone communication.

When the telephone set 2 transmits a call signal, the telephone set 2 and base unit 1 operates as follows. When the telephone set 2 performs a calling operation on the telephone line 3, the control circuit 22 determines that it should shift to the transmitting operation, locks the oscillating frequency of the synthesizer 19 to the control channel frequency, and turns on the receiver 14 to thereby cause same to receive waves at the control channel C-CH. The control circuit 22 detects the field intensity of the received waves at the control channel C-CH using the output detection signal from the received-field intensity detector 20. Unless the received-field intensity is higher than a predetermined value, the control circuit 22 determines that the control channel is idle and turns on the transmitter 17 to thereby cause same to transmit the ID code signal allocated to the telephone set 2. When the base unit 1 receives the ID code signal, it checks whether the ID code signal coincides with the ID code allocated to the combination of the base unit 1 and telephone set 2. If so, the base unit 1 turns on the transmitter 5 to cause same to transmit to the telephone set 2 an answer signal comprising the ID code and data designating S-CH.

When the telephone set 2 receives the answer signal from the base unit 1 through the control channel, it checks whether the ID code signal contained in the answer signal coincides with the ID code allocated to the telephone set 2. If so, the telephone set 2 changes the oscillating frequency of the synthesizer 19 to the frequency of the talking channel designated by the base unit 1.

After the base unit 1 has transmitted the answer signal, it also changes the oscillating frequency of the synthesizer 9 to the frequency of the talking channel designated for telephone communication. Thus the base unit 1 and telephone set 2 are connected through the talk channel designated by the base unit 1. Thereafter, by an dialing operation using dial key unit 32, the telephone set connected through the telephone line 3 is called to enable telephone communication.

As will be understood from the above description, when there is an incoming signal on the telephone line 3, the base unit 1 causes the speaker 23 to generate a ring tone until the telephone set 2 responds by the off-hook operation. Therefore, when there is no user at the telephone set 2 or in a range in which the ring tone reaches the user, the speaker 23 continues to generate the ring tone until the caller at the telephone line 3 terminates the attempted call. As a result, as long as there is an incoming signal on the telephone line 3, the battery 29 is consumed and eventually the telephone set 2 will cease to function.

It is an object of the present invention to provide a radio communication apparatus which reduces the consumption of the battery for a radio telephone set.

SUMMARY OF THE INVENTION

According to the present invention, the above object is achieved by a radio communication apparatus comprising a speaker provided at a base unit that generates a ring tone when there is an incoming signal from a telephone line. A charging detector is located in the base unit. The charging detector detects whether a radio terminal unit is connected to the base unit, and delivers a signal to a control circuit within the base unit indicating that, if the radio terminal unit is connected to the base unit, a battery within the radio terminal unit is being charged. If there is an incoming call from a telephone line while the battery is being charged, the control circuit causes the speaker to generate a ringing tone without connecting the radio telephone unit and the telephone line by radio.

If, on the other hand, there is an incoming call from a telephone line while the battery within the radio terminal unit is not being charged, the control circuit causes the radio terminal unit to generate a ring tone for a predetermined time.

A volume control circuit within the radio terminal unit controls the volume of the ring tone generated by the radio terminal unit so that the volume increases gradually with time.

Therefore, the time during which the ringing tone is generated when the battery within the radio telephone unit is not being charged is restricted to within a predetermined time so that the consumption of the battery energy is reduced.

BRIEF DESCRIPTION OF THE DRAWINGS

FIGS. 2–6 are flowcharts explaining the operation of the embodiment shown in FIG. 1.

DESCRIPTION OF THE PREFERRED EMBODIMENTS

Figure 1:
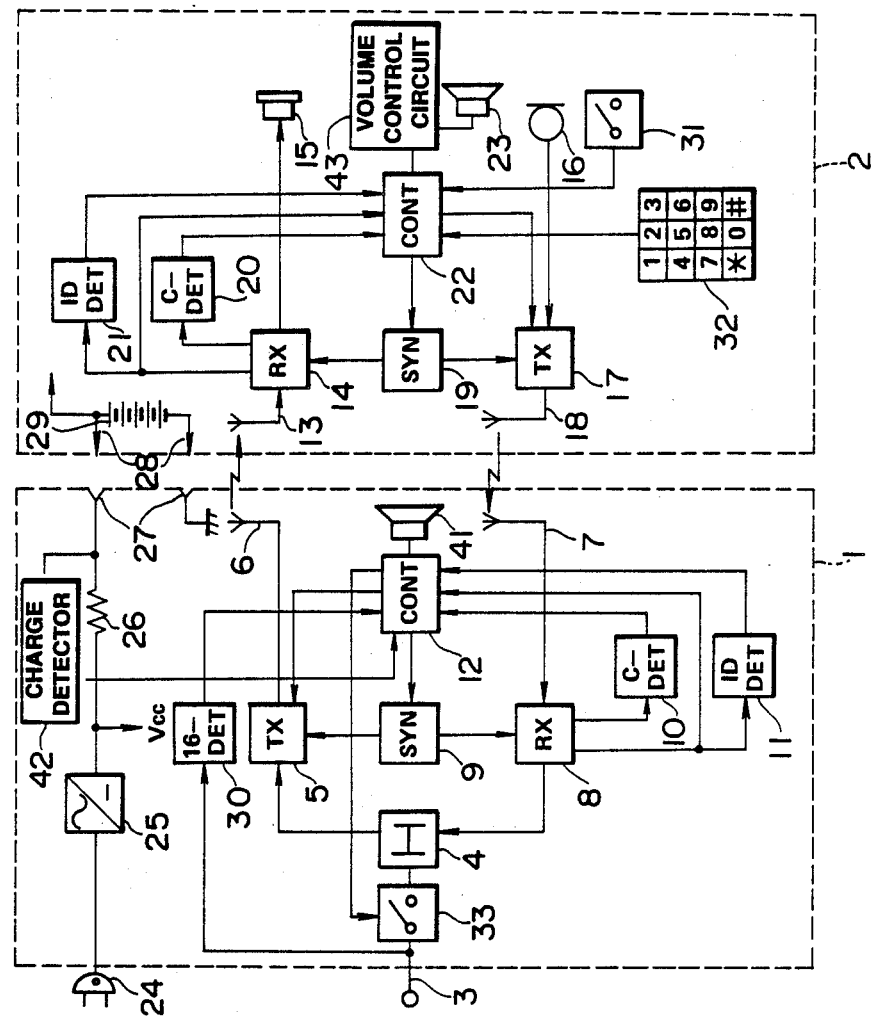
FIG. 1 is a block diagram of one embodiment of a radio communication apparatus according to the present invention.
Figure 7:
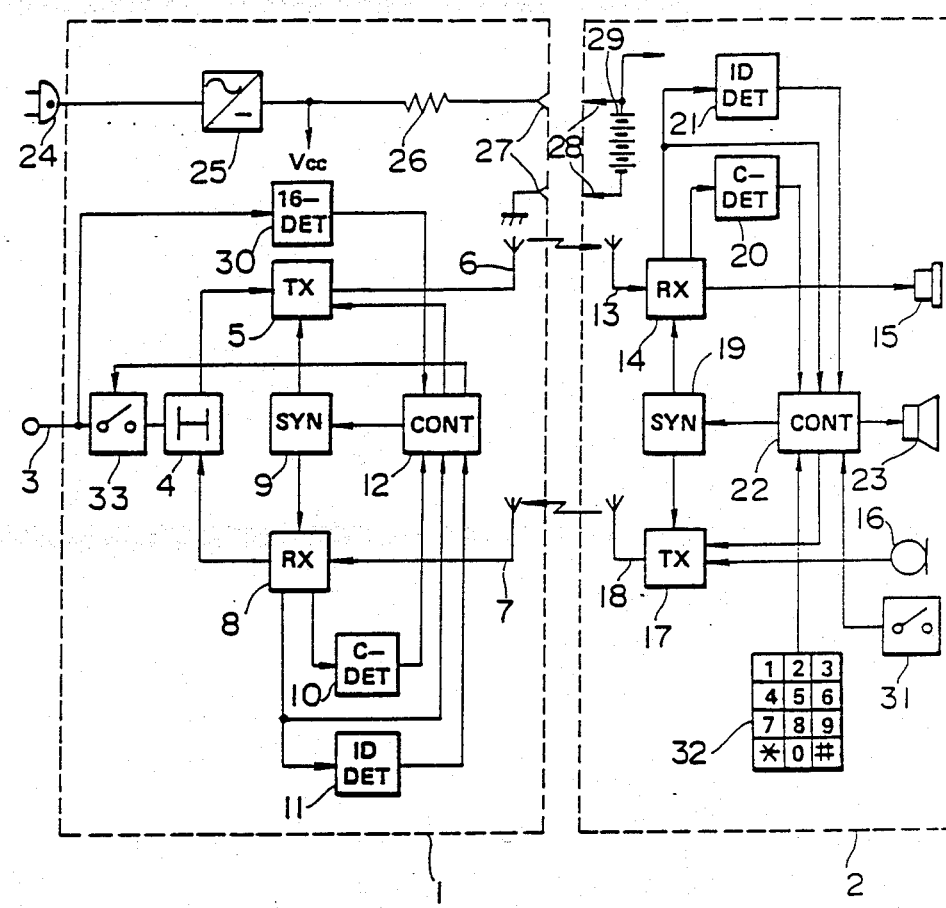
FIG. 7 is a block diagram of a conventional radio communication apparatus.

FIG. 1 is a block diagram of one embodiment of a radio communication apparatus according to the present invention in which a base unit 1 includes a speaker 41, a charge detector 42 and a control circuit 12 which determines whether a ring tone is to be generated in the base unit or in the radio telephone set in accordance with the charged/non-charged state of the telephone set 2. The radio telephone set 2 includes a volume control circuit 43 which controls the volume of the ring tone. Except at this structure, the radio communication apparatus of FIG. 1 is the same as the conventional apparatus of FIG. 7.

In operation, the control on the transmission and reception of calls in a non-charging state in which the radio telephone set 2 is not connected to the base unit 1 for charging purposes is basically the same as that in the conventional apparatus except that when the base unit 1 does not receive an off-hook signal which should be generated by the off-hook response of the radio telephone set a predetermined time after the base unit 1 has transmitted a bell ring signal toward the radio telephone set 2 in the non-charged state, the control circuit 12 instead causes the speaker 41 of the base unit 1 to generate the ring tone. When the radio telephone set 2 receives the incoming signal, the volume control circuit 43 causes the speaker 23 to gradually increase with time the volume of the ring tone generated from the speaker, for example, to 70, 80, 90dB . . . in this order at intervals of one minute.

Therefore, even if the user of the radio telephone set 2 is at a slight distance from the telephone set 2, he can surely know that there is an incoming call, and an unresponded state and hence the consumption of the battery 29 are prevented from continuing long due to a small ringing tone.

If there is no off-hook response after a lapse of a predetermined time, the control circuit 12 of the base unit 1 transmits a signal which stops the bell ring, then interrupts the radio circuit between the telephone set 2 and the base unit 1, and causes the speaker 41 of the base unit 1 to generate a ring tone. Therefore, the duration of the ring tone generated by the radio telephone set 2 is restricted to within a predetermined time. As a result, useless consumption of the battery 29 energy is prevented.

In a charged state in which the radio telephone set 2 is connected to the base unit 1 in order to charge the battery 29, a charging detector 42 detects that the battery 29 is in the charged state, and delivers to the control circuit 12 a signal indicating that the battery is being charged. The control circuit 12 detects with that signal that the telephone set 2 is in the charged state. If there is an incoming call from the telephone line 3 under such conditions, the control circuit 12 causes the speaker 41 to generate a ring tone without connecting the radio telephone set 2 and the telephone line 3 by radio. The user of the telephone set 2 performs an off-hook operation in response to that ring tone from the speaker 41. By this operation, a radio circuit is established between the base unit 1 and telephone set 2 to thereby enable telephone communication.

Figure 3:
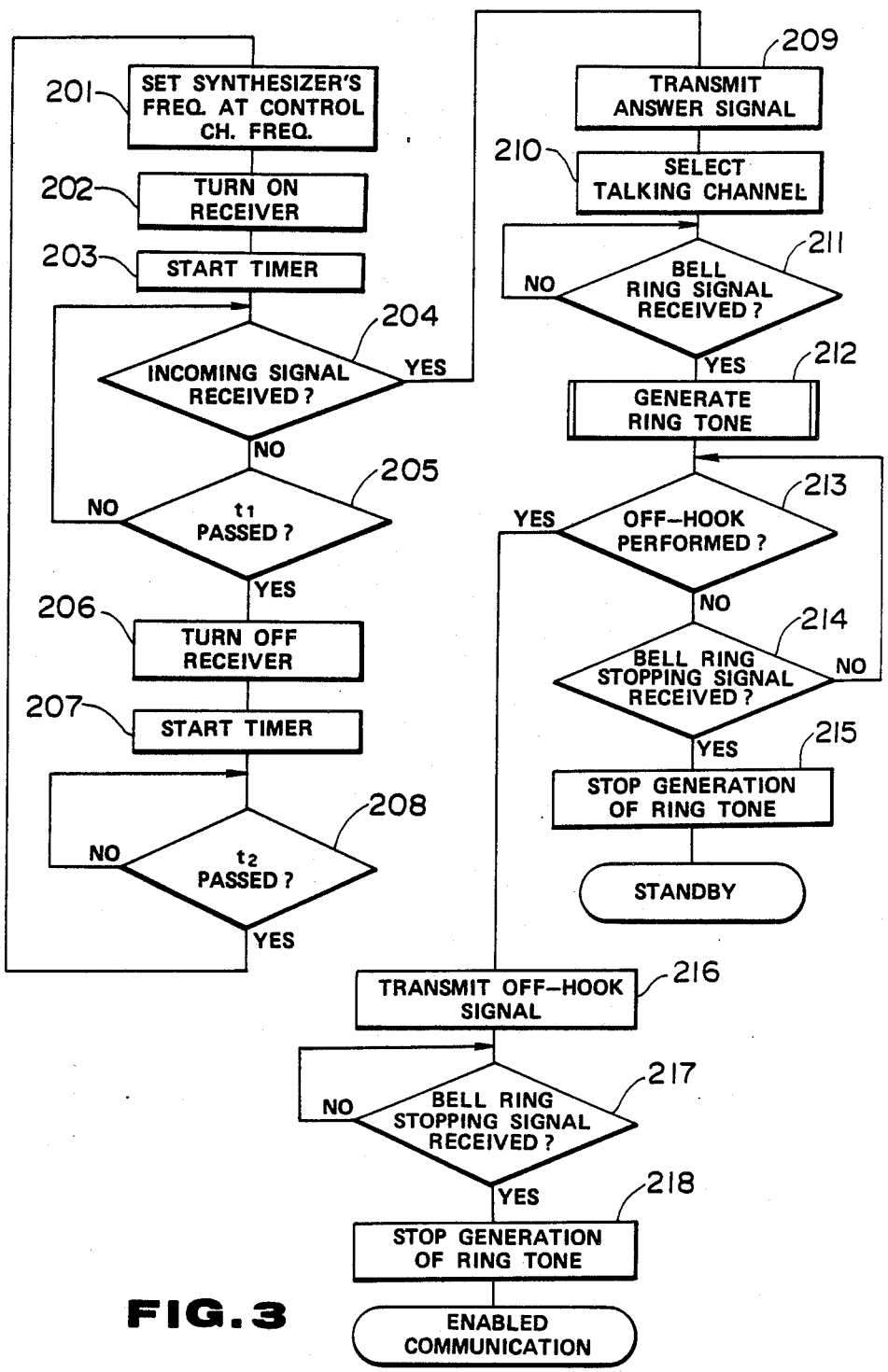

FIG. 2 illustrates one example of the operation of the control circuit 12 of the base unit 1 performed when there is an incoming call from the telephone line 3. FIG. 3 illustrates one example of the operation of the control circuit 22 of the telephone set 2 in that case.

If there is an incoming signal on the telephone line 3, this signal is detected by the incoming signal detector 30. Thus, the control circuit 12 determines that there is an incoming signal (step 101). Subsequently, the control circuit 12 determines whether the telephone set 2 is in the charged state in accordance with the output from the charging detector 42 (step 102).

If the telephone set 2 is disconnected from the base unit 1 and is in the non-charged state, the base unit 1 sets the oscillating frequency of the synthesizer 9 to the control channel frequency (step 103), turns on the transmitter 5 (step 104), clears a count N (step 105) and transmits the incoming signal to the telephone set 2 via the antenna 6 (step 106). The incoming signal contains a channel designating signal designating an idle talking channel.

Under such conditions, the telephone set 2 turns on the receiver 14 for a predetermined interval of time t1, then turns off the receiver 14 for a predetermined interval of time t2, and repeats these operations to perform an intermittent reception. In more detail, as shown in FIG. 3, the control circuit 22 of the telephone set 2 sets the oscillating frequency of the synthesizer 19 at the control channel frequency (step 201), turns on the receiver 14 (step 202), starts a timer (not shown) (step 203), checks whether the incoming signal from the base unit 1 has been received (step 204), and repeats this checking until the interval of time t1 has passed. After the interval of time t1 has passed (step 205), the control circuit 22 turns off the receiver 14 (step 206), and again starts the timer (step 207). When the control circuit detects a lapse of an interval of time t2 (step 208), it again sets the frequency of the synthesizer at the control channel frequency (step 201), and then turns on the receiver 14 (step 202). The control circuit then repeats these operations.

When the receiver 14 receives an incoming signal from the base unit 1 at step 204, the control circuit 22 delivers an answer signal by driving the transmitter 17 (step 209), and switches the channel from the radio channel of the receiver 14 and transmitter 17 to their talking channel (step 210). The answer signal transmitted at step 209 contains an ID code to identify the radio telephone set 2. The switching to the talking channel at step 210 is performed in accordance with the channel designating signal contained in the incoming signal.

When the base unit 1 receives the answer signal from the telephone set 2 (step 107), it determines whether the ID code contained in the answer signal coincides with a preset ID code (step 108). If so, base unit switches the channel from the radio channels of the transmitter 5 and receiver 8 of the base unit 1 to their talking channels corresponding to the channel designating signal contained in the incoming signal (step 109). It is determined at step 107 that there is no received answer signal, the base unit 1 increments the count N by one (step 110), checks whether the count N has reached a predetermined count n, for example, of 10 (step 111). If N is smaller than n, control again returns to step 106 where the base unit transmits the incoming signal. The transmission of the incoming signal is repeated n times. The reason why it is arranged that the transmission of the incoming signal is repeated n times is that the radio telephone set performs an intermittent reception at predetermined periods, as mentioned above. If the count N reaches n at step 111, the base unit returns to its standby state.

When the control circuit 12 of the base unit 1 selects the talking channel, it transmits a bell ring signal (step 113), and starts a timer (not shown) (step 114).

When the control circuit 22 of the telephone set 2 receives that bell ring signal (step 211), it drives the speaker 23 via a volume control circuit 43 to thereby cause the speaker 23 to generate a ring tone.

Figure 4:
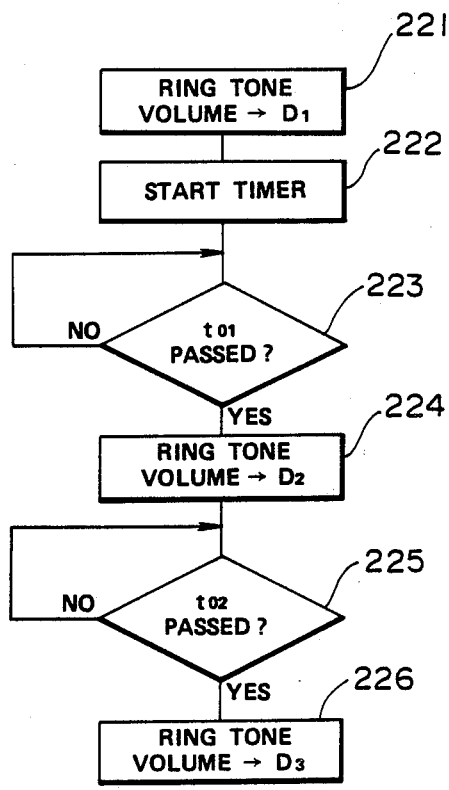

This ring tone is controlled such that it increases gradually in volume with time. This control is provided, for example, in accordance with a flowchart shown FIG. 4. The control circuit 22 controls the volume control circuit 43 to set the volume of the ring tone at D1 (step 221), and starts a timer (not shown) (step 222). When the control unit detects a lapse of an interval of time t01 (step 223), it sets the volume of the ring tone at D2 larger than D1 (step 224). When an interval of time t02 has passed (step 225), the control circuit sets the volume of the ring tone at D3 larger than D2 (step 226). In this way, the volume of the ring tone generated by the speaker 23 is controlled so as to increase gradually.

If the operator of the telephone set 2 performs an off-hook operation in response to the ring tone generated by the speaker 23 (step 213), the telephone set 2 transmits an off-hook signal to the base unit 1 (step 216).

When the base unit 1 receives this off-hook signal (step 115), it transmits a bell ring stopping signal (step 116), and turns on the line relay 33 (step 117) to enable communication.

When the telephone set 2 receives the bell ring stopping signal (step 217), it stops the transmission of the ring tone (step 218) to thereby enable communication.

If the base unit 1 does not receive an off-hook signal from the telephone set 2 even when an interval of time t3 has passed after the bell ringing signal has been transmitted at step 113 and the timer is then started at step 114 (step 118), the base unit delivers a bell ring stopping signal (step 119), interrupts the radio circuit between the base unit 1 and telephone set 2 (step 120), and drives the speaker 41 of the base unit 1 to thereby cause the speaker 41 to generate a ring tone (step 121).

When the telephone set 2 receives the bell ring stopping signal (step 214), it stops the generation of the ring tone (step 215) and shifts to its standby state.

As just described above, when the operator at the telephone set 2 does not perform an off-hook operation even if a predetermined interval of time, for example, t3, has passed after the ring tone has been generated from the speaker 23 of the telephone set 2, the ring tone generated from the speaker 23 of the telephone set 2 is stopped and instead the ring tone is generated from the speaker 41 of the base unit 1. Thereafter, the operator will perform an off-hook operation at the telephone set 2 in response to the ring tone generated by the speaker 41 of the base unit 1.

Figure 5:
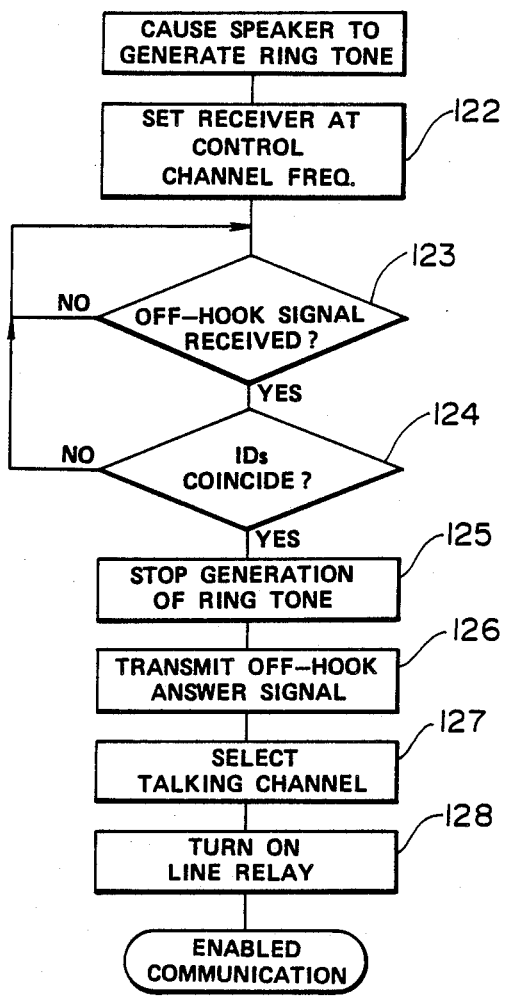
Figure 6:
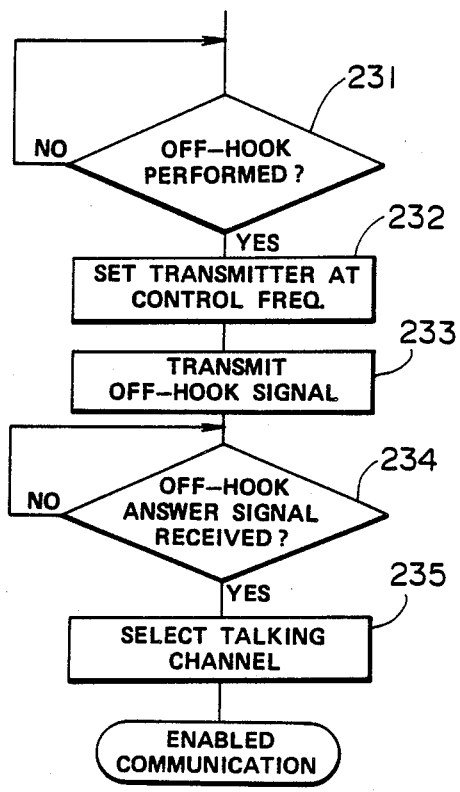

The operations of the base unit 1 and telephone set 2 will now be described which are performed after the operator has performed an off-hook operation at the telephone set 2 in response to the ring tone generated by the speaker 41 of the base unit 1. The operation of the base unit 1 in this case is illustrated in the flowchart of FIG. 5 while the operation of the telephone set 2 is illustrated in the flowchart of FIG. 6.

When the speaker 41 of the base unit 1 generates a ring tone, the base unit 1 sets the receiver 8 at the control channel frequency (step 122).

If the off-hook operation is performed at the telephone set 2 in response to the ring tone from the speaker 41 of the base unit 1 (step 231), the telephone set 2 sets the transmitter 17 at the control channel frequency (step 232), and transmits an on-hook signal to the base unit 1 (step 233). The off-hook signal contains an ID code to identify the telephone set 2.

When the base unit 1 receives this off-hook signal (step 123), it checks whether the ID code contained by the off-hook single coincides with the preset ID code (step 124). If so, it stops the generation of the ring tone from the speaker 41 (step 125) and transmits an off-hook answer signal containing a channel designating signal to designate an idle talking channel (step 126).

Thereafter, the base unit selects a talking channel corresponding to the channel designating signal (step 127), and turns on the line relay 33 (step 128) to enable communication.

When the telephone set 2 receives the off-hook answer signal from the base unit 1 (step 234), it selects a talking channel corresponding to the channel designating signal contained in the off-hook answer signal (step 235) to enable communication.

When the telephone set 2 performs an off-hook operation in response to the ring tone generated from the speaker 41 of the base unit 1, a radio circuit is established between the base unit 1 and telephone set 2 as shown in FIGS. 5 and 6 to thereby enable the telephone set 2 to make communication via the wire telephone line.

If it is determined that the battery is in the charged state at step 102 in FIG. 2, namely, if the base unit 1 and telephone set 2 are connected by means of the connectors 27 and 28 and the battery 29 for the telephone set 2 is being charged with the output from the rectification stabilizing circuit 25 of the base unit 1, no radio circuit is established between the base unit 1 and telephone set 2, and a ring tone is directly generated from the speaker 41 of the base unit 1 (step 112).

In this case, the operator performs an off-hook operation at the telephone set 2 in response to the ring tone generated from the speaker 41 of the base unit 1. The operations of the base unit 1 and telephone set 2 ranging from the off-hook operation to the establishment of the communication enable state are the same as those illustrated in FIGS. 5 and 6.

In the above embodiment the following three conditions are satisfied to suppress useless consumption of the battery 29:

(1) the speaker 41 of the base unit 1 is caused to generate a ring tone when there is an incoming call in the charged state;

(2) the radio telephone set 2 is caused to generate a ring tone for a predetermined time when there is an incoming signal in the non-charged state; and (3) the radio telephone set 2 is caused to generate a ring tone having a gradually increasing volume. Alternatively, the consumption of the battery 29 energy can be greatly suppressed even by satisfying at least the (1) and (2) conditions.

While in the above embodiment the radio telephone sets are illustrated as an example, the present invention may be applicable to any kinds of radio communication apparatus which handle, for example, data transmission, etc.

What is claimed is:

1. A radio communication apparatus comprising:
   a base unit connected to a communication line;
   a radio terminal unit driven by a battery and connected to the base unit via a radio circuit;
   a speaker provided at the base unit for generating a ring tone when there is an incoming signal from the communication line;
   means for detecting physical connection of the radio terminal unit to the base unit to charge the battery of the terminal unit; and
   control means for causing the speaker to generate a ring tone when there is an incoming signal from the communication line in a state where the radio terminal unit is physically connected to the base unit for charging the battery, and causing the radio terminal unit to generate a ring tone for a predetermined time when there is an incoming signal from the communication line in a non-charging state in which the radio terminal unit is not physically connected to the base unit.

2. A radio communication apparatus according to claim 1, wherein the communication line includes a telephone line and the radio terminal unit includes a radio telephone set.

3. A radio communication apparatus according to claim 1, wherein the control means includes means for causing the radio terminal unit to generate a ring tone for only the predetermined time when there is an incoming signal from the communication line in the non-charging state in which the radio terminal unit is not connected to base unit, and then causing the speaker of the base unit to generate a ring tone.

4. A radio communication apparatus comprising:
   a base unit connected to a communication line; and
   a radio terminal unit having a rechargeable battery and connected to the base unit through a radio circuit;
   wherein the base unit includes:
   a first ring tone generating means for generating a ring tone;
   incoming signal detecting means for detecting an incoming signal from the communication line;
   means for charging the rechargeable battery of the radio terminal unit when the radio terminal unit is physically connected to the base unit;
   means for detecting that the rechargeable battery is being charged by the charging means; and
   control means for causing the first ring tone generating means to generate a ring tone when the incoming signal detecting means detects that there is an incoming signal and the charge detecting means has detected that the rechargeable battery is being charged by the charging means, and for transmitting a ring tone signal to the radio terminal unit for causing the radio terminal unit to generate a ring tone when the incoming signal detection means detects an incoming signal and the charge detecting means has detected that the rechargeable battery is in a non-charging state in which the radio terminal is not physically connected to the base unit; and wherein the radio terminal unit includes:

a second ring tone generating means for generating a ring tone upon receiving a ring tone signal from the base unit;

volume control means for controlling the volume of a ring tone generated by the second ring tone generating means; and off-hook means for performing an off-hook operation in response to a ring tone generated by the first or second ring tone generating means.

5. A radio communication apparatus according to claim 4 wherein the communication line includes a telephone line and the radio terminal unit includes a radio telephone set.

6. A radio communication apparatus according to claim 4, wherein the control means stops the transmission of the ring tone signal and causes the second ring tone generating means to generate a ring tone when an off-hook operation is not performed by the off-hook means at the radio terminal unit even when a predetermined time has passed after the transmission of the ring tone signal.

7. A radio communication apparatus according to claim 4, wherein the control means stops the transmission of the ring tone signal and causes the first ring tone generating means to generate a ring tone when an off-hook operation is not performed by the off-hook means at the radio terminal unit even when a predetermined time has passed after the transmission of the ring tone signal.

8. A radio communication apparatus according to claim 4, wherein the volume control means controls the volume of the second ring tone generated by the second ring tone generating means so as to change the volume with time.

9. A radio communication apparatus according to claim 4, wherein the volume control means controls the volume of the second ring tone generated by the second ring tone generating means so as to change the volume stepwise with time.

* * * * *